United States Patent
Pinarbasi

(10) Patent No.: US 7,241,698 B2
(45) Date of Patent: *Jul. 10, 2007

(54) METHOD FOR SENSOR EDGE AND MASK HEIGHT CONTROL FOR NARROW TRACK WIDTH DEVICES

(75) Inventor: Mustafa Michael Pinarbasi, Morgan Hill, CA (US)

(73) Assignee: Hitachi Global Storage Technologies Netherlands BV, Amsterdam (NL)

(*) Notice: Subject to any disclaimer, the term of this patent is extended or adjusted under 35 U.S.C. 154(b) by 0 days.

This patent is subject to a terminal disclaimer.

(21) Appl. No.: 11/176,024

(22) Filed: Jul. 7, 2005

(65) Prior Publication Data

US 2007/0010044 A1  Jan. 11, 2007

(51) Int. Cl.
*H01L 21/302* (2006.01)
*H01L 21/461* (2006.01)

(52) U.S. Cl. ............ 438/738; 257/755; 257/E21.53; 257/E21.232; 438/105

(58) Field of Classification Search ............ 438/105, 438/738; 257/755, E21.53, E21.232, E21.236
See application file for complete search history.

(56) References Cited

U.S. PATENT DOCUMENTS 6,198,607 B1 * 3/2001 Cain et al. ............ 360/318.1

2003/0207207 A1  11/2003  Li
2004/0087166 A1  5/2004  Morrow
2005/0041341 A1  2/2005  Cyrille et al.
2005/0045997 A1  3/2005  Brummer et al.
2006/0067009 A1 *  3/2006  Cyrille et al. ............ 360/324.1

OTHER PUBLICATIONS

Etching mask for ceramic substrate, Research Disclosure Journal, ISSN 0374-4353, Kenneth Mason Publications Ltd. Feb. 1986.*

* cited by examiner

Primary Examiner—Michelle Estrada
Assistant Examiner—Jarrett J. Stark
(74) Attorney, Agent, or Firm—Bracewell & Giuliani LLP

(57) ABSTRACT

A process for defining and controlling the mask height of sensor devices is disclosed. An RIE-resistant, image layer, such as Cu or NiFe, is deposited after the DLC layer. A combination of RIE and ion milling processes or reactive ion beam etching processes are used to form the mask structure. Having an RIE-resistant layer precisely defines the DLC edge and minimizes the line edge roughness that result from fast removal of duramide during RIE. This solution controls the formation of the edges of the sensors and provides good definition for DLC mask edges. The image layer may be chemical mechanical polished to eliminate ion milling before the final RIE step.

11 Claims, 4 Drawing Sheets

METHOD FOR SENSOR EDGE AND MASK HEIGHT CONTROL FOR NARROW TRACK WIDTH DEVICES

BACKGROUND OF THE INVENTION

1. Technical Field

The present invention relates in general to the masking of devices during processing and, in particular, to an improved system and method for masking of sensors during processing for better control of sensor edges and mask height for sensors having a narrow track width.

2. Description of the Related Art

Current mask processes can be prone to track width (TW) control and junction definition issues between the various layers of the product that define the sensor width. These problems are illustrated in FIG. 1, which is a tunneling electron microscope (TEM) image of a sectioned masked wafer site 17. For example, the freelayer of the sensor has a TW length 11 that is wider than the width 13 of the mask. In addition, the side 15 of the mask (e.g., into and out of the page) is relatively rough rather than straight, and the edges of the diamond-like carbon (DLC) mask layer are sloped rather than relatively sharp.

The reasons for these variations are the different reactive ion etching (RIE) etch rates for the different mask layers. For example, hydrophilic polymer of acrylamide (e.g., DURAMIDE) etches significantly faster (e.g., about 45 Å/sec compared to about 16.7 Å/sec) than either DLC or photoresist (e.g., TIS). Since DURAMIDE is the masking layer for DLC, there is no static mask for DLC. This makes it nearly impossible to obtain well-defined DLC edges, which can induce large junction variations.

Another problem is encountered during RIE processing of relatively narrow TW sensor structures. In this disclosure, "narrow" TWs are defined as those less than approximately 100 nm, but this depends upon the application and the processes used. Mask structures for narrow TWs (i.e., carbon+DURAMIDE+ resist) have thickness values that are below critical level for successful chemical-mechanical polishing (CMP) lift-off processing. For example, post-RIE mask height is typically proportional to the TW.

In general, resist thickness is proportional to track width. Thus, narrow TW devices have less resist and therefore offer less protection to DURAMIDE during RIE than their wider counterparts. Moreover, photoresist and DURAMIDE are not ideal masks for DLC RIE. DURAMIDE RIE is a fast process and therefore yields large TW variations. Because the DURAMIDE RIE is fast, the DLC edge profiles are sloped resulting in extended freelayer edge damage. Since there is less photoresist remaining for narrow TW devices after develop, may be consumed during the subsequent RIE process resulting in significant mask height control issues.

The left side of FIG. 2 depicts an initial spin step 41 wherein layers of photoresist 43, DURAMIDE 45, and DLC 47 are formed on a sensor 55. In step 49 (center of FIG. 2), the layers are exposed and developed where the height of photoresist 43 is reduced, while DURAMIDE 45 and DLC 47 are essentially unchanged. In RIE/ion mill step 51 (right side of FIG. 2), photoresist 43 is completely removed and DURAMIDE 45 is partly removed, but it is virtually impossible to predict or control the resultant height 53 of the layers above the sensor 55. Thus, an improved solution for defining and controlling post-RIE mask height for narrow TW devices would be desirable.

SUMMARY OF THE INVENTION

One embodiment of a system, method, and apparatus for obtaining well-defined DLC mask edges is to have a static mask for the DLC layer. In the solution of the present invention, a RIE-resistant and/or CMP-resistant layer is deposited after the DLC layer. This new layer can be relatively thin since the RIE process is short. A combination of RIE and reactive ion beam etching (RIBE) processes, and ion milling processes are used to form the mask structure. Having an RIE-resistant layer precisely defines the DLC edge and minimizes the line edge roughness that results from fast removal of hydrophilic polymer of acrylamide (e.g., DURAMIDE during RIE.

The new mask structure protects the mask height for narrow TW devices. In one embodiment, an RIE-resistant metal layer (e.g., Rh, Cu, NiFe, etc.) is inserted between the DURAMIDE and resist layers. As described above, this structure is prepared by utilizing a combination of an RIE, ion mill, and RIBE. After resist is exposed and developed, the RIE-resistant material is removed by, for example, physical sputtering. The RIE process is then redeployed to clear the DURAMIDE and DLC layers. With the RIE-resistant metal layer, all DURAMIDE height is preserved during the RIE process, and the mask height may be precisely defined. In one embodiment, the RIE-resistant material is thin (on the order of about 50 Å) to minimize the milling process. Furthermore, the RIE-resistant layer may be processed by CMP to further reduce the processing steps to eliminate separate mill removal of the mask layer.

Still further improvement may be obtained with two image layers of RIE-resistant material. The top RIE-resistant layer protects the DURAMIDE during RIE. The bottom RIE-resistant layer mainly defines the DLC TW, and the DLC defines the sensor TW. Thus, there is better definition of the mask due to the additional layer. In addition, both image layers may be ion milled.

The foregoing and other objects and advantages of the present invention will be apparent to those skilled in the art, in view of the following detailed description of the present invention, taken in conjunction with the appended claims and the accompanying drawings.

BRIEF DESCRIPTION OF THE DRAWINGS

So that the manner in which the features and advantages of the invention, as well as others which will become apparent are attained and can be understood in more detail, more particular description of the invention briefly summarized above may be had by reference to the embodiment thereof which is illustrated in the appended drawings, which drawings form a part of this specification. It is to be noted, however, that the drawings illustrate only an embodiment of the invention and therefore are not to be considered limiting of its scope as the invention may admit to other equally effective embodiments.

DETAILED DESCRIPTION OF THE INVENTION

Figure 1:
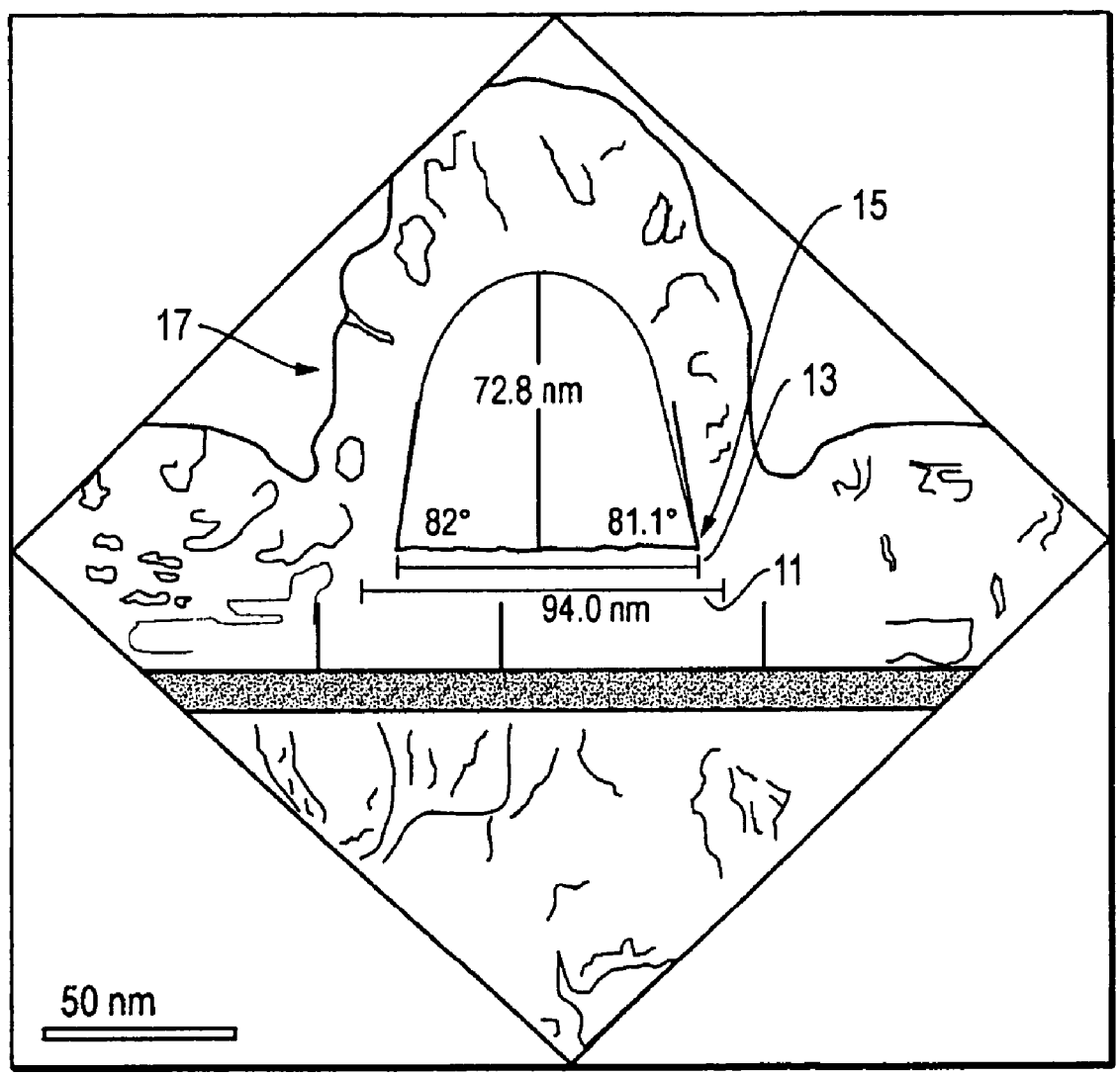
FIG. 1 is a sectional side view of a tunneling electron microscope image of a conventionally masked sensor.
Figure 2:
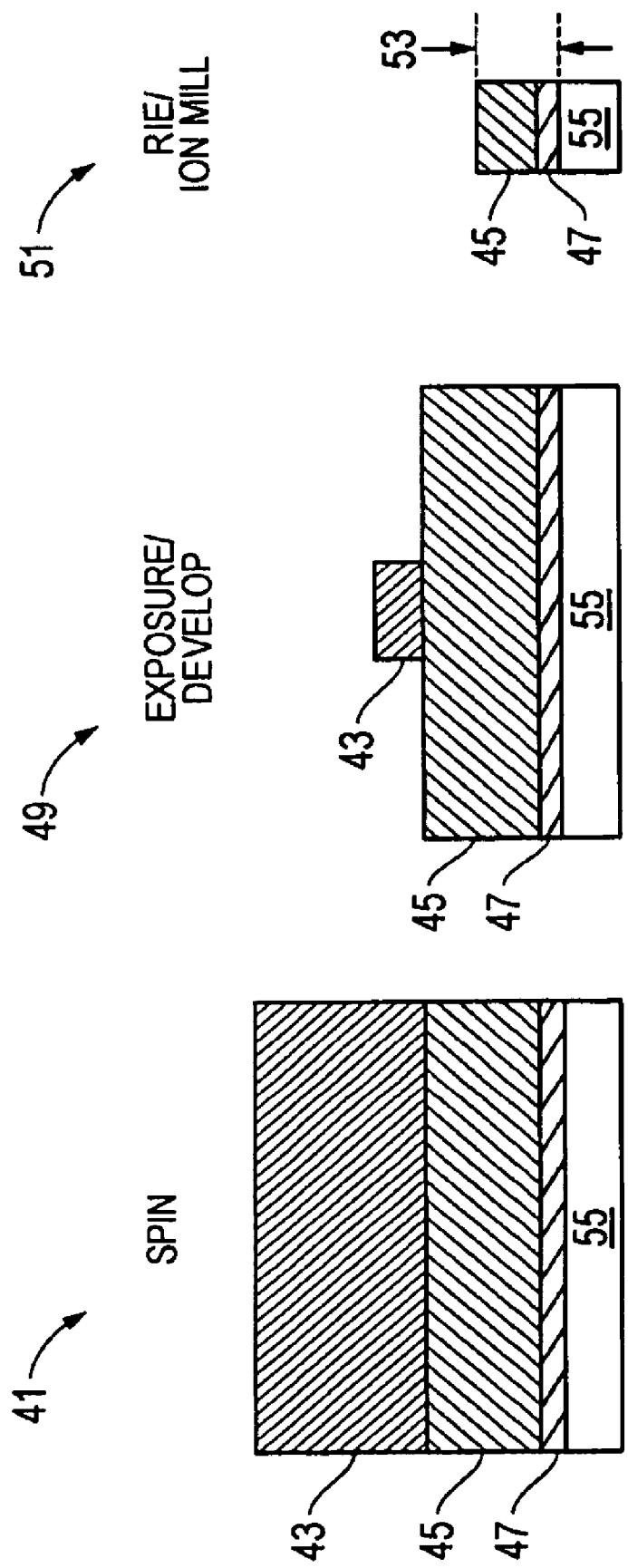
FIG. 2 is a schematic diagram of a conventional masking process.
Figure 3:
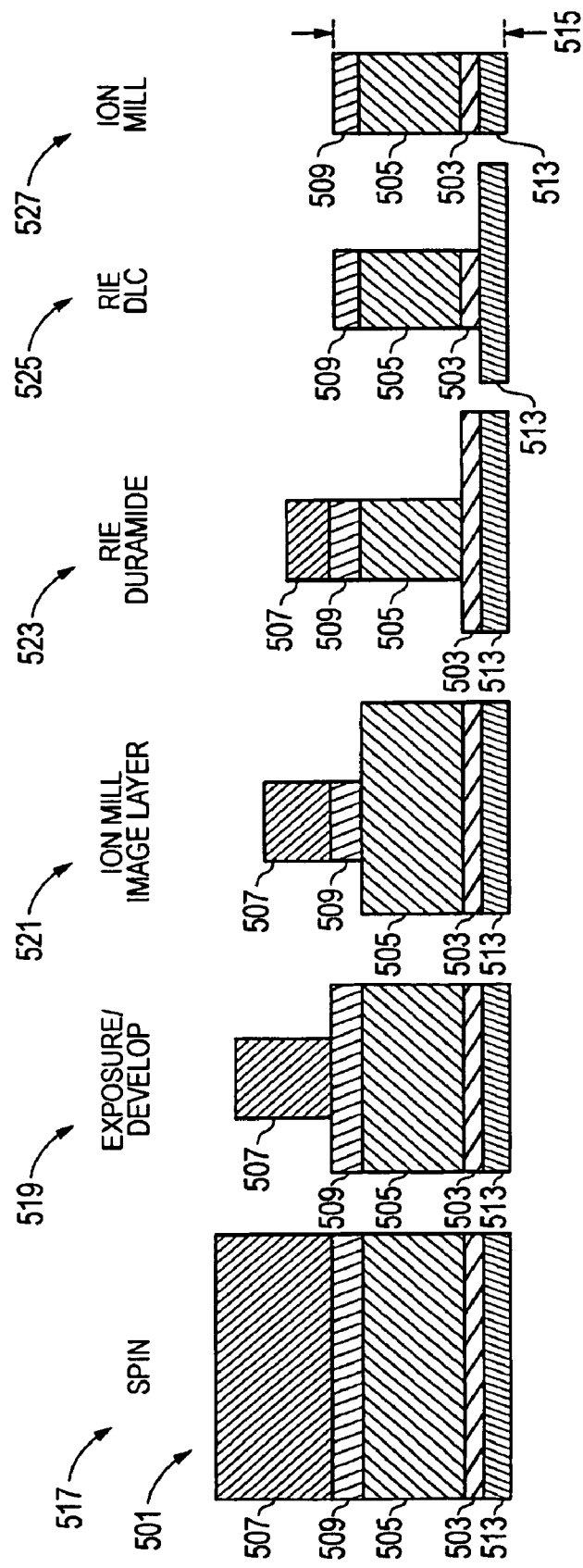
FIG. 3 is a schematic diagram of another embodiment of a masking process constructed in accordance with the present invention.
Figure 4:
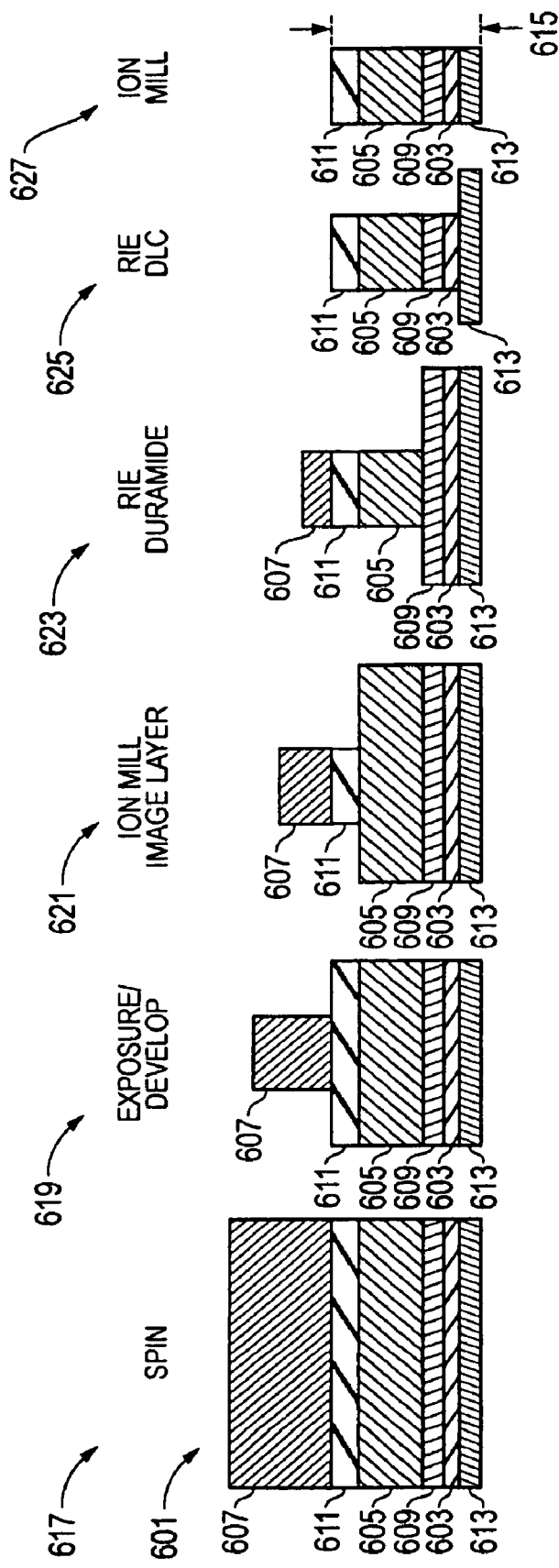
FIG. 4 is a schematic diagram of still another embodiment of a masking process constructed in accordance with the present invention.

Referring to FIGS. 3 and 4, embodiments of the present invention are shown. At its most basic level, the present invention comprises a system and method of forming a mask for a structure.

In FIG. 3, the mask or image layer 509 is located directly between hydrophilic polymer of acrylamide (e.g., DURAMIDE) 505 and photoresist (e.g., TIS) layers 507. The image layer 509 is RIE-resistant and, in one embodiment, CMP resistant as well. In another embodiment (FIG. 4), the image layer comprises two different image layers 609 and 611. First image layer 609 is located directly between the DLC and DURAMIDE layers 603, 605, and second image layer 611 is located directly between the DURAMIDE and photoresist layers 605, 607.

In the embodiments of FIGS. 3 and 4, the mask or image layers 509, 611, respectively, may be located directly between the DURAMIDE and photoresist layers 505, 507 and 605, 607, respectively, in order to better control the mask height 515, 615 (far right side of FIGS. 3 and 4, respectively). The image layer(s) may be removed with physical sputtering. These embodiments of processing a sensor device comprise forming a structure 501, 601 having a sensor 513, 613 and a mask including a DLC layer 503, 603, a DURAMIDE layer 505, 605, and a photoresist layer 607, respectively.

The image layer 509, 611 is located in the mask between the DLC layer and the photoresist layer to control the height 515, 615 of the mask extending in an orthogonal direction from a plane defined by the sensor 513, 613, respectively. One embodiment of a method of the present invention comprises spin processing 517, 617 the mask; exposing and developing 519, 619 the mask; ion milling 521, 621 the image layer 509, 611; reactive ion etching 523, 623 the mask; and then reactive ion etching 525, 625 the mask, respectively, before being ion milled 527, 627 to define the height 515, 615 of the mask. The formation of the image layers 509, 609, 611 may be performed as described above for the previous embodiments. In one version, the top RIE-resistant layer protects the DURAMIDE during RIE, and the bottom RIE-resistant layer defines the DLC TW, and the DLC defines the sensor TW. Thus, there is better definition of the mask due to the additional layer.

As shown in both FIGS. 3 and 4, the method may comprise reactive ion etching 523, 623 the DURAMIDE layer 505, 605, and reactive ion etching 525, 625 the DLC layer 503, 603. As shown in FIG. 4, the mothod may comprise positioning or locating one of the image layers 609 directly between the DLC and DURAMIDE layers 603, 605, and another image layer 611 directly between the DURAMIDE and photoresist layers 605, 607 to define two layers for protecting the DURAMIDE layer 605 during reactive ion etching. Furthermore, as depicted in FIG. 4, the method may comprise ion milling 621 the image layer 611, and ion milling 627 the other image layer 609. In addition (FIGS. 3 and 4), the method also may comprise reactive ion etching 523, 623 the DURAMIDE layer 505, 605, and reactive ion etching 525, 625 the DLC layer 503, 603. Other steps and functions may be performed as described above for the previous embodiments.

While the invention has been shown or described in only some of its forms, it should be apparent to those skilled in the art that it is not so limited, but is susceptible to various changes without departing from the scope of the invention.

A process for defining and controlling the mask height of sensor devices is disclosed. An RIE-resistant, image layer, such as Cu or NiFe, is deposited after the DLC layer. A combination of RIE and ion milling processes or reactive ion beam etching processes are used to form the mask structure. Having an RIE-resistant layer precisely defines the DLC edge and minimizes the line edge roughness that result from fast removal of DURAMIDE during RIE. This solution controls the formation of the edges of the sensors and provides good definition for DLC mask edges. The image layer may be chemical mechanical polished to eliminate ion milling before the final RIE step.

What is claimed is:

1. A method of modifying a height of a structure with a mask, the method comprising:
   (a) providing a sensor having a track width;
   (b) forming a mask on the sensor to define a structure, the structure having a height that is perpendicular to the track width, and the mask having a DLC layer, a hydrophilic polymer of acrylamide layer, a photoresist layer, and an image layer of RIE-resistant material located directly between and in contact with the hydrophilic polymer of acrylamide layer and the photoresist layer, the image layer having an image layer height in a range of approximately 20 to 100 Å; and
   (c) processing the structure to reduce the height of the structure for a track width of less than approximately 100 nm.

2. A method according to claim 1, wherein step (b) further comprises forming a second image layer directly between the DLC and hydrophilic polymer of acrylamide layers to define two image layers.

3. A method according to claim 1, wherein step (c) comprises processing the structure with processes selected from the group consisting of RIE, ion milling, and reactive ion beam etching.

4. A method according to claim 1, wherein the image layer comprises a material selected from the group consisting of Rh, Cu, and NiFe.

5. A method according to claim 1, further comprising forming the image layer with chemical-mechanical polishing.

6. A method of precisely controlling a height of a structure with a mask, the method comprising:
   (a) providing a sensor having a track width extending in a horizontal direction;
   (b) forming a mask on top of the sensor in a vertical direction that is perpendicular to the horizontal direction such that the sensor and the mask define a structure, the structure having a height in the vertical direction, and the mask having a DLC layer, a hydrophilic polymer of acrylamide layer, a photoresist layer, a first image layer of RIE-resistant material directly between and in contact with the hydrophilic polymer of acrylamide layer and the photoresist layer, a second image layer of RIE-resistant material directly between and in contact with the DLC layer and the hydrophilic polymer of acrylamide layer, and each image layer having an image layer height in a range of approximately 20 to 100 Å;
   (c) spin processing the structure;
   (d) exposing and developing the structure;
   (e) ion milling the first image layer;

(f) processing the structure; and then (g) reactive ion etching the structure to precisely control and reduce the height of the structure for a track width of less than approximately 100 nm.

7. A method according to claim 6, wherein step (f) comprises reactive ion etching the hydrophilic polymer of acrylamide layer, step (g) comprises reactive ion etching the DLC layer, and further comprising ion milling the mask after step (g).

8. A method according to claim 6, wherein step (g) further comprises ion milling said second image layer.

9. A method according to claim 6, wherein step (f) comprises reactive ion etching the hydrophilic polymer of acrylamide layer, and step (g) comprises reactive ion etching the DLC layer.

10. A method of precisely controlling and reducing a height of a structure with a mask, the method comprising:

(a) providing a sensor having a track width extending in a horizontal direction;

(b) forming a mask on top of the sensor in a vertical direction that is perpendicular to the horizontal direction such that the sensor and the mask form a structure, the structure having a height in the vertical direction, and the mask having a DLC layer, a hydrophilic polymer of acrylamide layer, and a photoresist layer, a first image layer of RIE-resistant material located directly between and in contact with the hydrophilic polymer of acrylamide layer and the photoresist layer, and a second image layer of RIE-resistant material located directly between and in contact with the DLC layer and the hydrophilic polymer of acrylamide layer, each image layer having an image layer height in a range of approximately 20 to 100 Å;

(c) spin processing the structure;

(d) exposing and developing the structure;

(e) ion milling the first image layer;

(f) reactive ion etching the hydrophilic polymer of acrylamide layer to precisely control and reduce the height of the structure;

(g) reactive ion etching the second image layer and the DLC layer to define the track width of the structure at less than approximately 100 nm; and then (h) ion milling the mask.

11. A method according to claim 10, further comprising forming the image layers with CMP.

* * * * *